(12) United States Patent
Subramaniyan et al.

(10) Patent No.: US 10,884,402 B2
(45) Date of Patent: Jan. 5, 2021

(54) ANALYTICS ENGINE

(71) Applicant: Baker Hughes, Houston, TX (US)

(72) Inventors: Arun Karthi Subramaniyan, Niskayuna, NY (US); Alexandre N. Iankoulski, Niskayuna, NY (US); Raj Ramalingam, San Ramon, CA (US)

(73) Assignee: Baker Hughes, Houston, TX (US)

( * ) Notice: Subject to any disclaimer, the term of this patent is extended or adjusted under 35 U.S.C. 154(b) by 143 days.

(21) Appl. No.: 16/170,028

(22) Filed: Oct. 24, 2018

(65) Prior Publication Data

US 2019/0137983 A1 May 9, 2019

Related U.S. Application Data

(60) Provisional application No. 62/576,639, filed on Oct. 24, 2017.

(51) Int. Cl.
| | | |
|---|---|---|
| *G05B 23/02* | (2006.01) | |
| *G06F 17/18* | (2006.01) | |

(Continued)

(52) U.S. Cl.
CPC ....... *G05B 23/0216* (2013.01); *G05B 23/024* (2013.01); *G05B 23/0272* (2013.01);
(Continued)

(58) Field of Classification Search
CPC ............ G05B 13/041; G05B 19/41885; G05B 2219/23456; G05B 23/0216;
(Continued)

(56) References Cited

U.S. PATENT DOCUMENTS 9,519,861 B1 * 12/2016 Gates ................. G01N 15/0826
2009/0132458 A1    5/2009 Edwards et al.
(Continued)

FOREIGN PATENT DOCUMENTS

EP         2474706 A2    7/2012

OTHER PUBLICATIONS

International Search Report and Written Opinion for corresponding International Application No. PCT/US2018/057419, dated Mar. 4, 2019.

*Primary Examiner* — Michael J Brown
(74) *Attorney, Agent, or Firm* — Mintz Levin Cohn Ferris Glovsky and Popeo, P.C.

(57) ABSTRACT

Sensor data is received characterizing operational data associated with a machine. A data analytic specification is received from a user. The received operational data can be processed using the data analytic. A visual representation of the processed operational data can be rendered, within a graphical user interface display space. A digital model characterizing the machine can be generated based on user input received in the graphical user interface. Additional sensor data can be received. The digital model can be updated based on the received additional sensor data. A recommendation for modifying an input value and/or an operational parameter of the machine can be determined using the updated model. The recommendation can be rendered within the graphical user interface space. Related apparatus, systems, techniques and articles are also described.

17 Claims, 9 Drawing Sheets

(51) Int. Cl.
  *G06Q 50/06*   (2012.01)
  *G06F 16/25*   (2019.01)
  *G06N 20/00*       (2019.01)
  *G06N 5/02*        (2006.01)
  *G05B 13/04*       (2006.01)
  *E21B 21/08*       (2006.01)
  *E21B 45/00*       (2006.01)

(52) U.S. Cl.
  CPC ............ *G06F 16/256* (2019.01); *G06F 17/18* (2013.01); *G06Q 50/06* (2013.01)

(58) Field of Classification Search
  CPC ... G05B 23/0272; G05B 23/024; E21B 21/08; E21B 44/00; E21B 44/005; E21B 45/00; E21B 47/06; E21B 47/12; E21B 49/003; G06N 20/00; G06N 5/02; G06N 5/022; G06N 5/025; G06F 16/254; G06F 17/18; G06Q 50/06
  USPC .......................................................... 700/83
  See application file for complete search history.

(56) References Cited

U.S. PATENT DOCUMENTS

| | | |
|---|---|---|
| 2012/0118637 A1 | 5/2012 | Wang et al. |
| 2014/0039793 A1 | 2/2014 | Querales et al. |
| 2016/0356125 A1 | 12/2016 | Bello et al. |

\* cited by examiner

ANALYTICS ENGINE

CROSS-REFERENCE TO RELATED APPLICATION

This application claims priority under 35 U.S.C. § 119(e) to U.S. Provisional Patent Application No. 62/576,639 filed Oct. 24, 2017, the entire contents of which is hereby expressly incorporated by reference herein.

BACKGROUND

Handling industrial data can require a different approach than transactional and consumer data. In some instances, this is due to a confluence of several factors. Traditional consumer data systems can store transactional data like logistics reports, maintenance logs, inventory logs, and the like. Oil and gas industrial data, on the other hand, can be 10-100 times more voluminous, can be collected at 100-1000 times greater velocity and can have 5-10 times more variety. Also, a large portion of industrial datasets are unstructured data such as text, images, audio and video which are generally considered "dark data" due to their unstructured nature. Accessing, organizing, and processing industrial data, such as dark data, for example, can be challenging.

SUMMARY

In an aspect, sensor data is received characterizing operational data associated with a machine. A data analytic specification is received from a user. The received operational data can be processed using the data analytic. A visual representation of the processed operational data can be rendered, within a graphical user interface display space. A digital model characterizing the machine can be generated based on user input received in the graphical user interface. Additional sensor data can be received. The digital model can be updated based on the received additional sensor data. A recommendation for modifying an input value and/or an operational parameter of the machine can be determined using the updated model. The recommendation can be rendered within the graphical user interface space.

One or more of the following features can be included in any feasible combination. For example, the digital model can be configured to calculate an output value based on a characteristic mathematical representation of the oil and gas industrial machine, the characteristic mathematical representation including a system of equations to calculate the output value and using the received operational parameters. Updating the digital model can include updating at least one variable in the system of equations and evaluating the updated model to determine an updated output value. The oil and gas industrial machine can include one or more of a crude distillation unit, control valves, a reservoir, a casing unit, pumps and tubing unit.

Data characterizing one or more of the digital model and an updated output value can be communicated to a global monitoring system configured to monitor the oil and gas industrial machine. An instruction to modify operation of the industrial machine can be transmitted to a controller of the oil and gas industrial machine. Metadata can be rendered within a graphical user interface space and related to the received data analytic. The metadata can include statistical properties, gaps, distributions and/or correlations.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
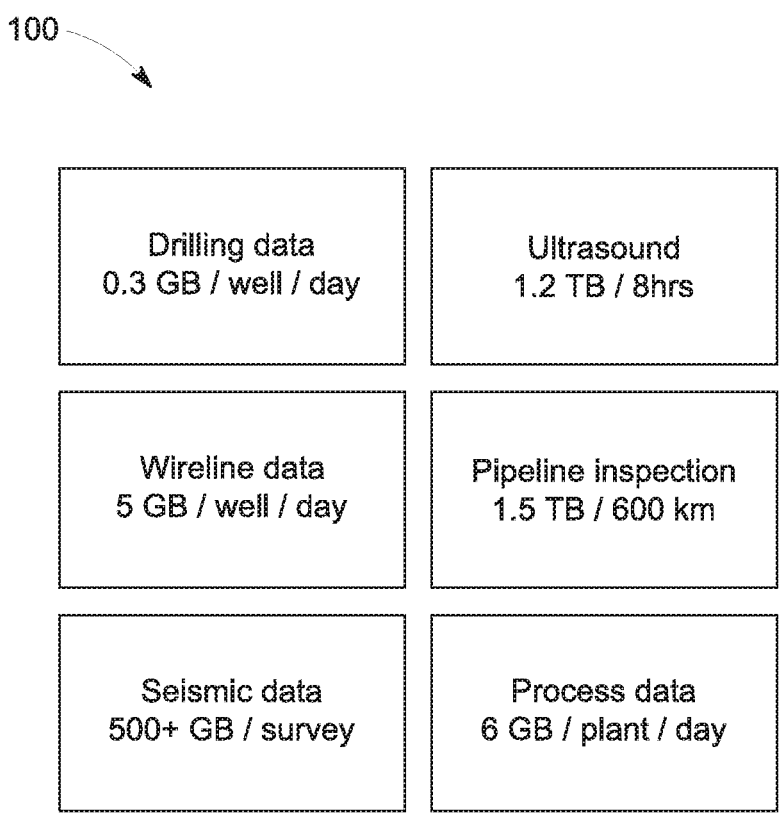
FIG. 1 illustrates example data generation rates for drilling data, ultrasound, wireline data, pipeline inspection, seismic data, and process data within industrial settings.

An immense volume of data is generated in industrial settings. For example, FIG. 1 illustrates a table 100 with example data generation rates for drilling data, ultrasound, wireline data, pipeline inspection, seismic data, and process data within industrial settings.

In some implementations, an analytics engine includes a generic, scalable, and adaptable architecture, method and framework that can accommodate a variety of analytics written in different languages and can enable analytics to work together in orchestrations of complexity to provide meaningful insights in the right context and at the right time.

Furthermore, analytics can be injected and hot-swapped at runtime, different versions of analytics can run in parallel, and new analytics can be matured iteratively, validated, and on-boarded interactively into different runtimes, which are known to the framework. In some instances, components can be replaced and runtime information and/or configurations are flexible (e.g., not hard-coded). The framework can be largely driven by a dynamic catalog where the elements of the architecture as well as their interactions are registered. As the needs of the architecture change, the catalog can mature and evolve to accommodate any current and new workloads and requirements.

In some implementations, the current subject matter includes an analytics engine that can ingest analytics written in multiple programming languages into a cloud-agnostic, software-as-a-service application, catalog and orchestrate them across distributed runtimes including cloud and edge; provide an automated framework to hot-swap analytics at runtime within an orchestrated workflow (both on-demand and on-schedule); run multiple versions of analytics or entire orchestrations live to evaluate KPIs and enable what-if scenarios; elastically scale infrastructure based on analytics at runtime and predicted runtime requirements agnostic of the deployment infrastructure; provide a federated catalog and runtime for analytics sharing with built-in internet protocol protections and integrity guarantees; and the like.

The analytics engine can receive data via a query engine that can include a distributed system that provides a quick access to data stored in multiple silos. This can be done through a variety of intelligent caching mechanisms and querying algorithms along with a scalable architecture. This approach can help to accelerate simple and complex analytics development at scale.

Some implementations of the analytics engine are not limited to operational parameters or oil and gas industrial data. In some implementations, the analytics engine can operate on data from many sources which be even seemingly unrelated or in silos. Also it may take advantage of large quantities of historical data, both horizontally (e.g., thousands of sensors) and vertically (e.g., long historical record such as decades of data at high frequency).

Figure 2:
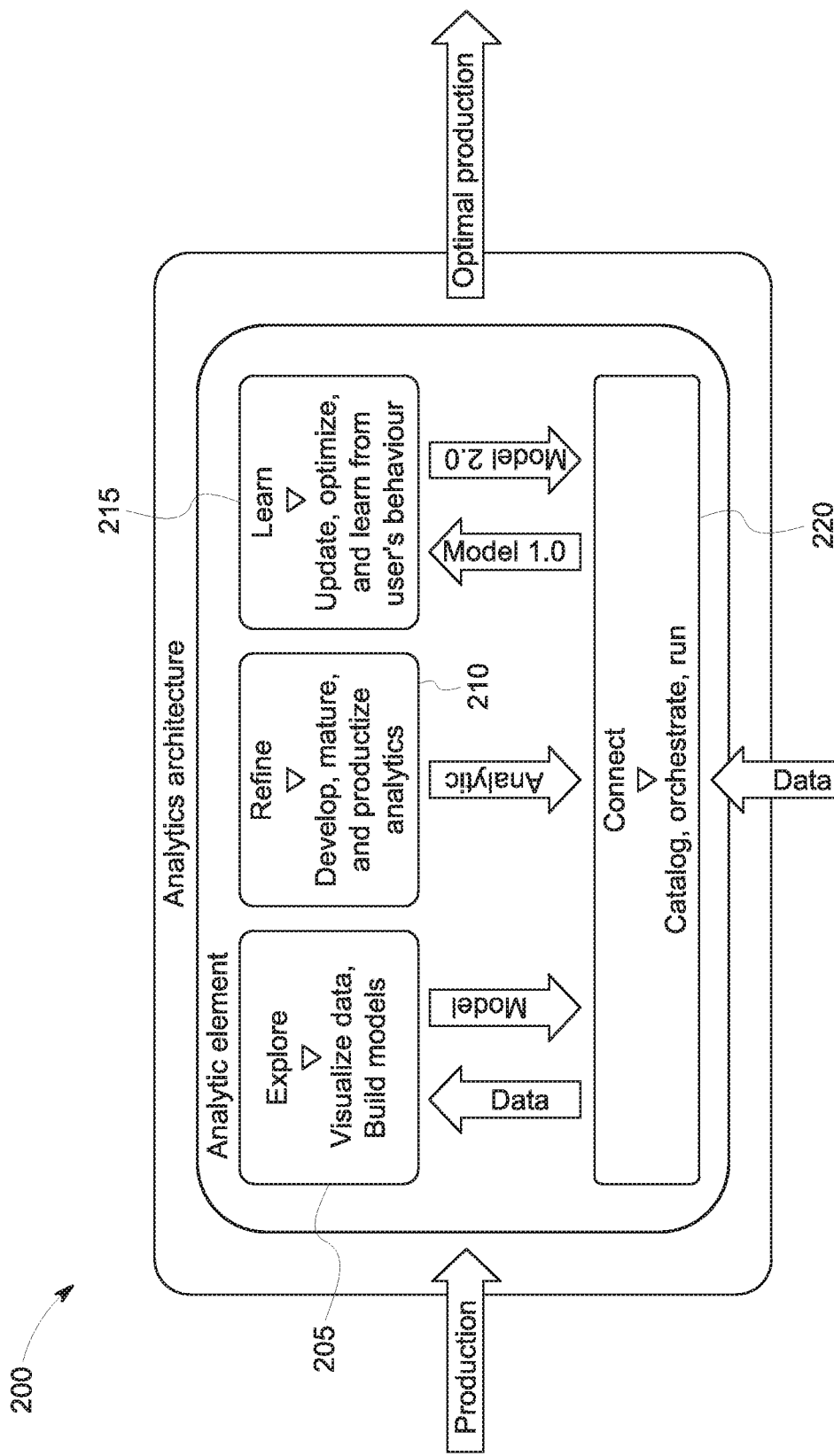
FIG. 2 is a system block diagram of an example analytics engine.
Figure 8:
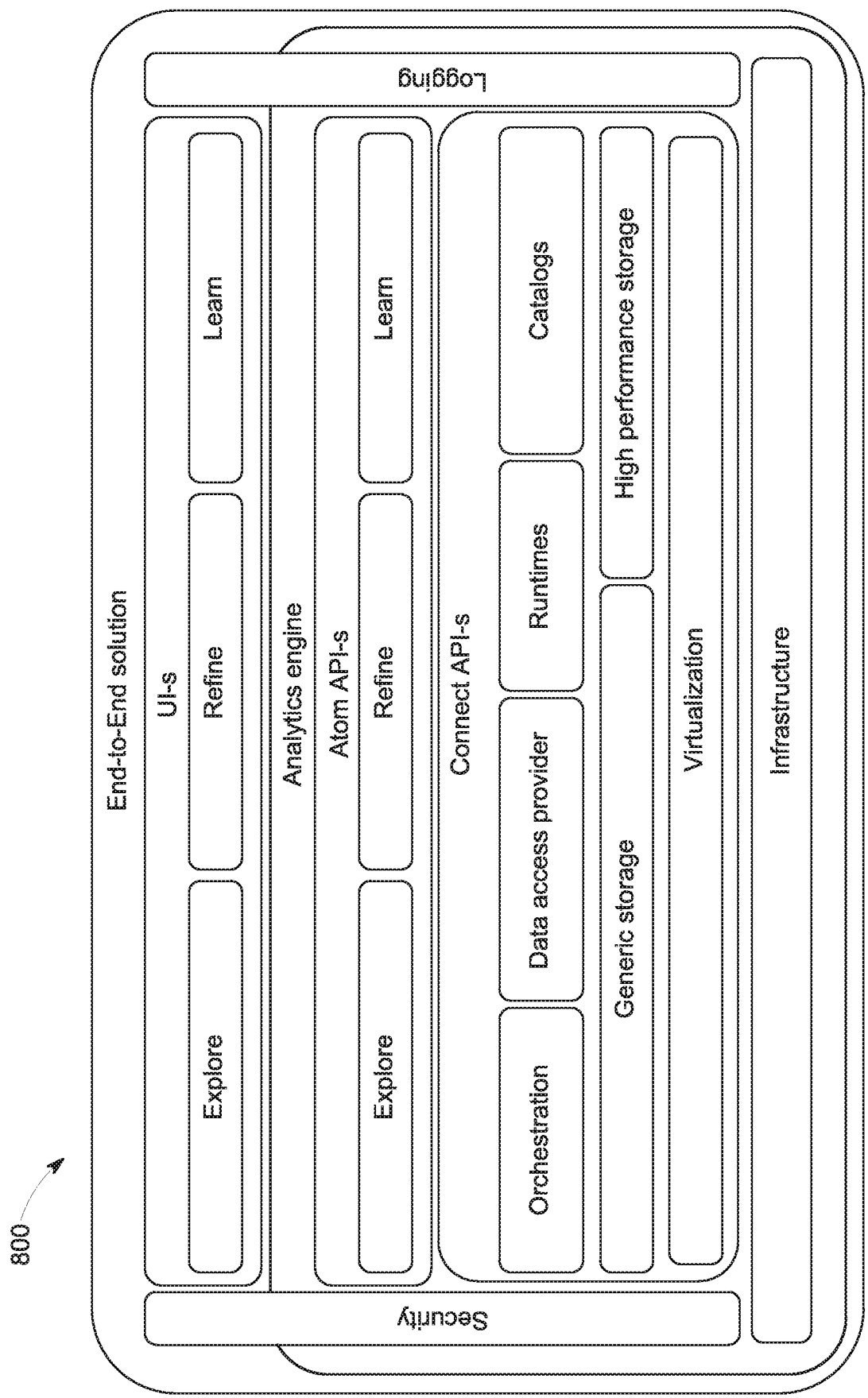
FIG. 8 is a system block diagram illustrating components of the analytics engine illustrating the analytics engine can enable an end-to-end solution.

FIG. 2 is a system block diagram 200 illustrating an example analytics engine. The analytics engine 200 can provide a simple way to migrate analytics, data, orchestrations, and supporting configurations between different edge and cloud environments. FIG. 8 is a system block diagram 800 illustrating components of the analytics engine 200 illustrating the analytics engine can enable an end-to-end solution.

The analytics engine 200 includes an analytic element 225 that can include an explore module 205, a refine module 210, a learn module 215, and a connect module 220. The analytics engine 200 enables the construction of existing and new analytics within a computing platform regardless of language or technology of the analytic. Moreover, the analytics engine 200 can make the analytics work together to solve problems previously considered unsolvable. Further, the analytics engine 200 can scale both horizontally and vertically based on the volume of data and application.

The analytics engine 200 can receive production data (e.g., industrial machine operational parameter information) and provide for data visualization, analytics, and enable improvement or optimization of production.

The explore module 205 enables visualization of data and building of models by interfacing with the connect module 220. In some implementation, model building can include a guided build process, by which the analytics engine evaluates the data available, proactively builds a large number of models, and suggests the best model types (e.g., deep learning, linear regression, etc.) for a user to select for modeling the underlying oil and gas application (e.g., oil well, LNG plant, and the like). The ranked list of models can include the best models that can be built with the data that is available.

Refine module 210 provides for testing and production of analytics. For example, a user can provide (e.g., upload, link to, and the like) analytic specifications (e.g., code) that can be in anyone of a wide range of languages. The refine module 210 can automatically assess the analytic and provide a readiness level, and enable user input including enabling review by a subject matter expert user. Refine module 210 can interface with the connect module 220 for importing data, such as test data. Using the refine module 210, a user can ingest, store, assess, score and catalog analytics. Refine can enable associating, maintaining and using of document. In some implementations, refine 210 can provide a cloud-based integrated design environment for specifying the analytics. Refine module 210 can allow for linking to a code repository, which can be external or internal. Refine module 210 can utilize and/or interface with software development kits (SDKs) and knowledge repositories. Once an analytic is approved, refine module 210 can publish the analytic to the catalog, from where it can be used in production orchestrations.

Learn module 215 provides for optimization, learning and recommendations. Learn module 215 can continuously monitor operational data and model performance, update models based on historical user behavior, provide for global optimization, uncertainty quantification, robust optimization, generate recommendations for improving production, provide product insights, various analytic services, tag mapping, and the like. In some implementations, the analytics engine can analyze and learn from system and user behaviors.

Connect module 220 provides for runtime environments, orchestration of analytics, access to data stores, and can include a generic searchable catalog that can provide what data and orchestrations are available for a given application.

Figure 9:
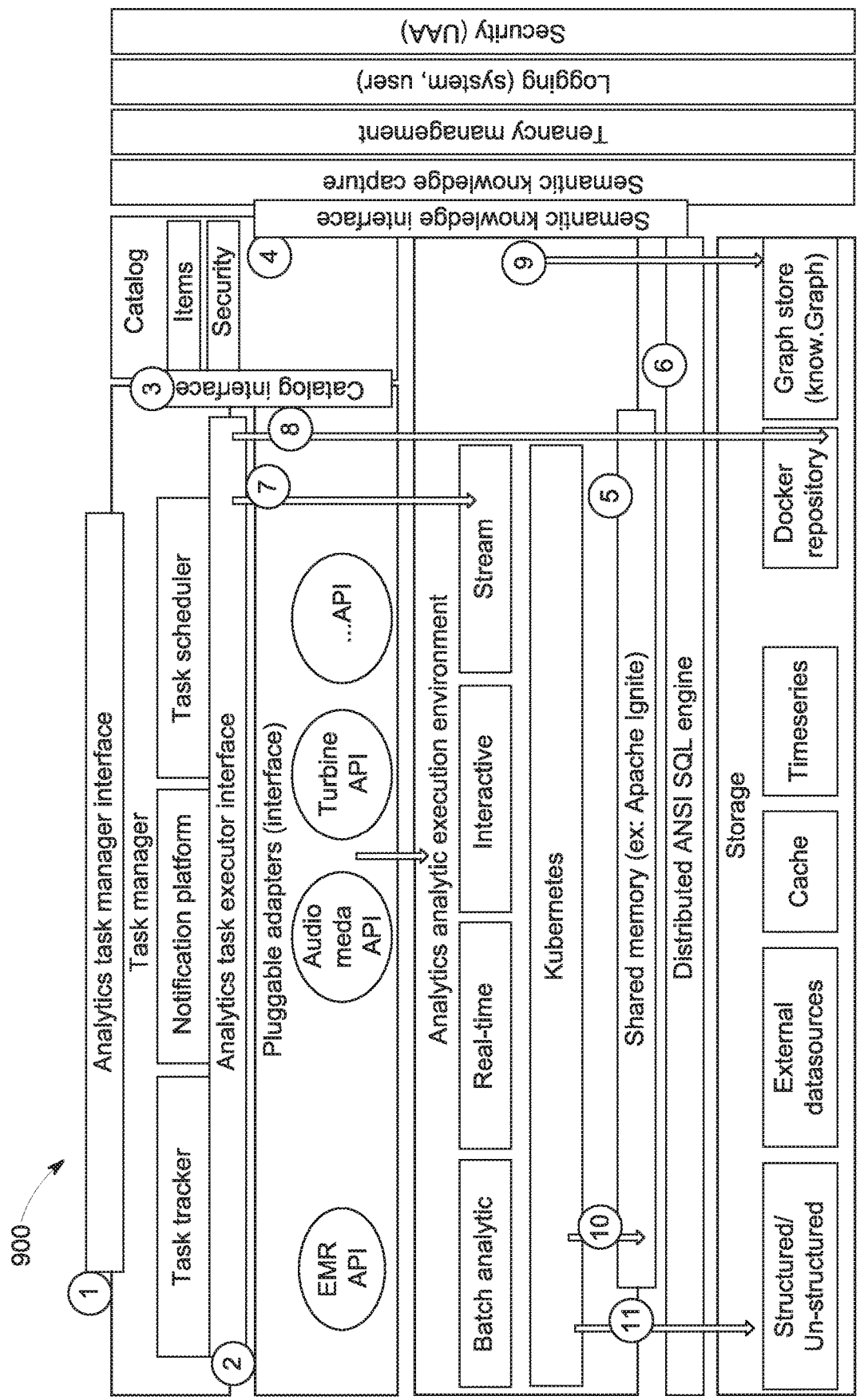
FIG. 9 is a system block diagram illustrating an example architecture overview of the example analytics engine.

FIG. 9 is a system block diagram illustrating an example architecture overview of the example analytics engine. The example architecture can be flexible, because it is modular, uses API's to abstract implementations and pluggable adapters to enable switching out of components depending on the needs of the particular application or problem that is being solved. This can enable deployment to various environments (single or multi-cloud, on-premise, or edge), use of embedded or managed services (e.g. PostgreSQL vs Amazon RDS), and switching components as needed (e.g. using various container runtimes, datastores, and the like). The analytics engine can be used as a standalone system by end users, or can be used as a service by other applications (e.g., useable by people or machines)

The analytics engine 200 can receive production data (e.g., operational data of industrial machines and plants) and determine or recommend changes in order to result in an optimal production. For example, oil/gas production can include a complex combination of several sub-processes that can be related to various units of the oil production system. For example, the oil production system can include crude distillation unit, control valves, reservoir, casing unit, pumps, tubing unit and the like. Liquefied Natural Gas ("LNG") production system can include wells, slug catcher unit, condensate column unit, condensate tank unit, $CO_2$ separator unit, and the like. Using the current subject matter, the overall oil/gas production can be improved by improving one or more of sub-processes. A sub-process can be improved by providing a user with what-if scenarios for the sub-process in an automated or semi-automated manner. In the what-if scenario, operating parameters (e.g., state parameters, user configurable parameters, and the like) of the sub-process can be tweaked to identify the parameter values that can improve the overall oil and gas production.

Figure 7:
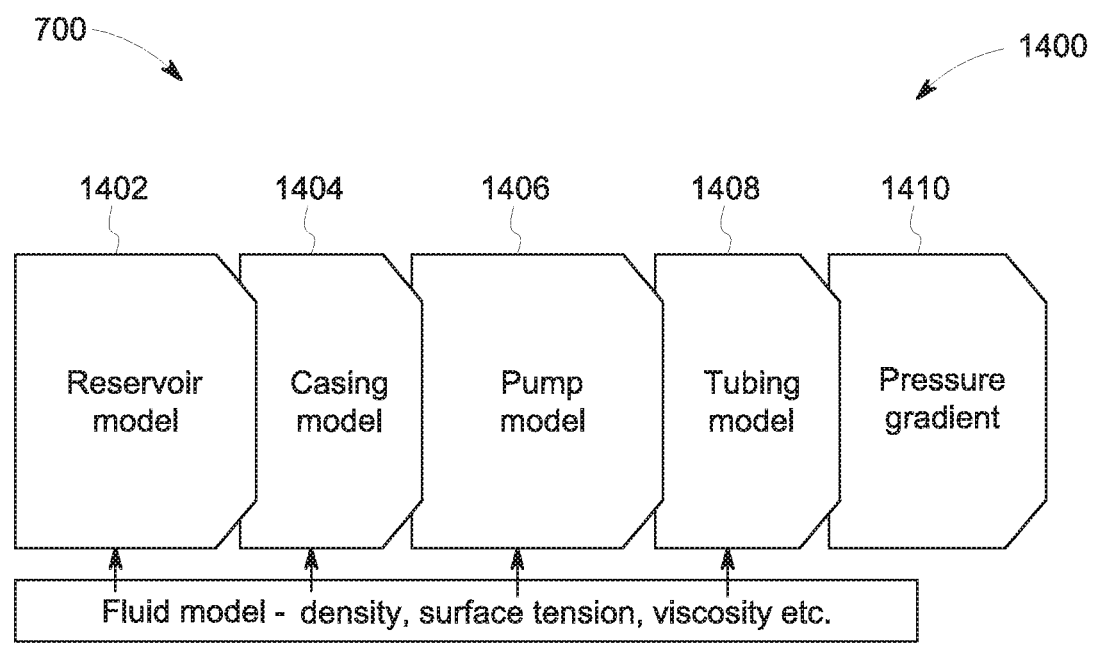
FIG. 7 describes an exemplary model implemented in an example analytics engine that can improve the overall oil production of a well by providing what-if scenarios for various sub systems in a robust and automated way.

FIG. 7 describes an exemplary model 1400 implemented in an example orchestration that can be run within the analytics engine that can improve the overall oil production of a well by providing what-if scenarios for various sub systems in a robust and automated way. The model 1400 can guide a user to improve oil production, and consequently improve the profitability and provide a competitive edge. The model 1400 can include sub-models for various sub-units: reservoir model 1402, casing model 1404, pump model 1406, tubing model 1408, and pressure gradient model 1410. A user can follow the workflow shown in FIG. 14 to improve the operation of each of the sub-units. Operating parameters for one or more the sub-models can be tuned and calibrated (e.g., automatically by an optimizer solution program that uses various predetermined ranges of operating parameter values, manually by the user in a trial and error approach, and the like). The user can monitor and visualize the efficiency of the various sub-processes and/or the efficiency of the entire process (e.g., by monitoring barrels per unit of horse power consumed).

Model 1400 can be executed automatically on a periodic basis, or upon triggering by an event defined by the user. A user can identify a "global" oil production optimum by running the what-if scenarios for each sub-model by providing values for operating parameters in the sub-models. The user can verify these parameters by evaluating the impact of the recommendations and either accept or reject them. The user can review the pump curves via explore 205 before accepting the changes.

An example of a more complex orchestration scenario can include running a model of each well simultaneously to optimize performance of an entire oil field, or several oil fields. This can be important because wells do not operate in silos and changing the operating parameters of one well affects production in adjacent wells. The scalability and orchestration capabilities of the analytics engine thus enable global optimization which may not be possible with some traditional approaches.

Figure 3:
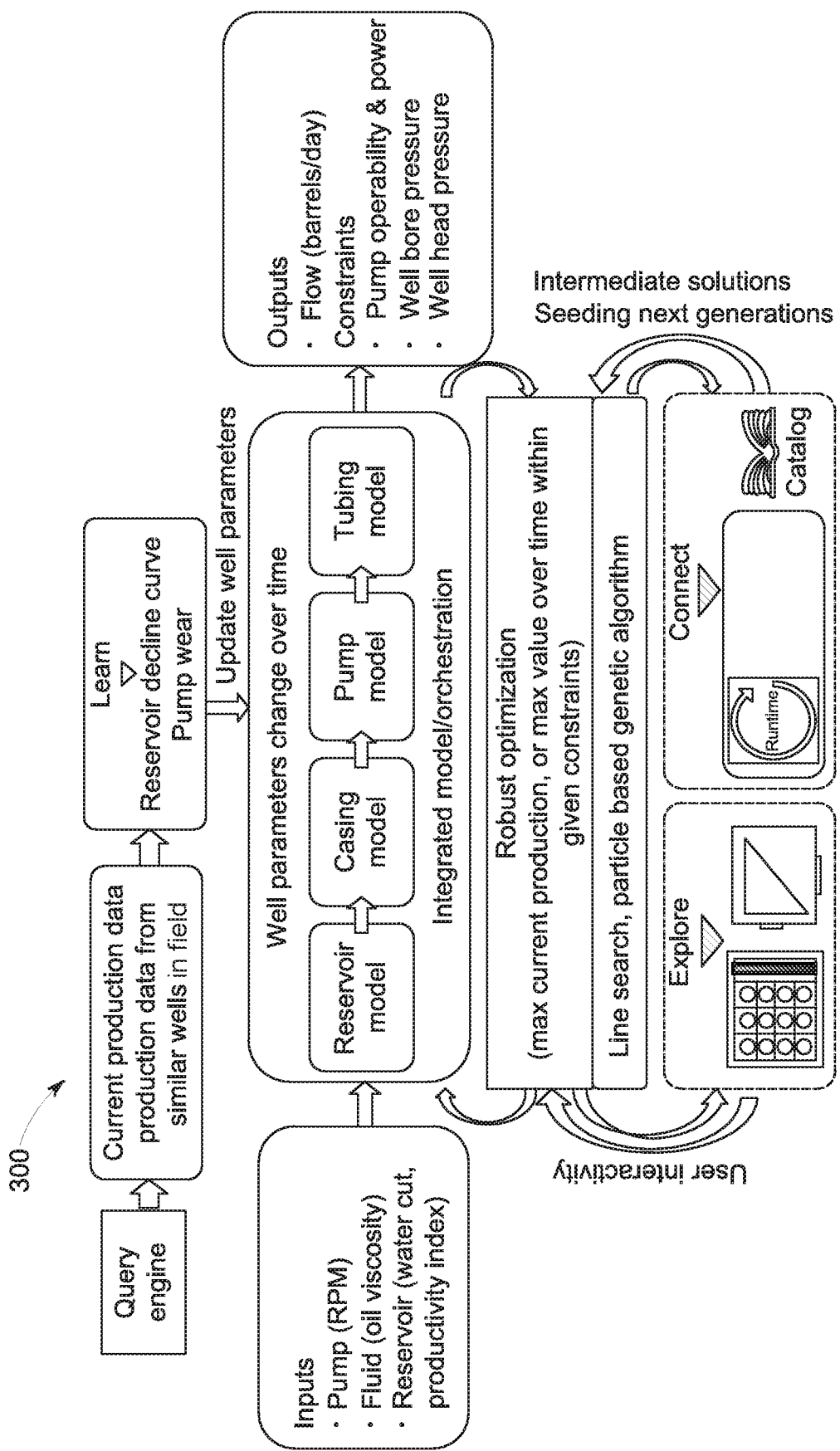
FIG. 3 is a system block diagram of an example for using the analytics engine for optimizing outputs of one or more oil wells.

FIG. 3 is a system block diagram 300 of an example for using the analytics engine for optimizing outputs of one or more oil wells. The analytics engine receives inputs such as pump frequency (rpm), fluid or oil viscosity, and reservoir data (water cut, productivity index, and the like). The analytics engine further receives current production data and production data from similar wells in field from the query engine. Using these inputs, well parameters can be updated based on an integrated model of the oil well. Determining well parameters can include performing an optimization algorithm. The optimization can be performed in connection with user interactivity, by providing visualizations of data, models, and the like. The example analytics engine outputs flow (barrels/day) and constraints such as pump operability, power, well bore pressure, and well head pressure.

In some implementations, data consumers (end-users, applications, and applications developers) can easily access data in disparate formats and sources seamlessly with minimal effort and time. The analytics engine can provide data communication via a single secure catalog.

Data Consumers may not need to know or understand the underlying technological complexities or worry about data sources for their data. A layer of abstraction can reduce technical overhead of coding and testing. Some implementations of the current approach can save data consumers application development and data exploration time.

Figure 4:
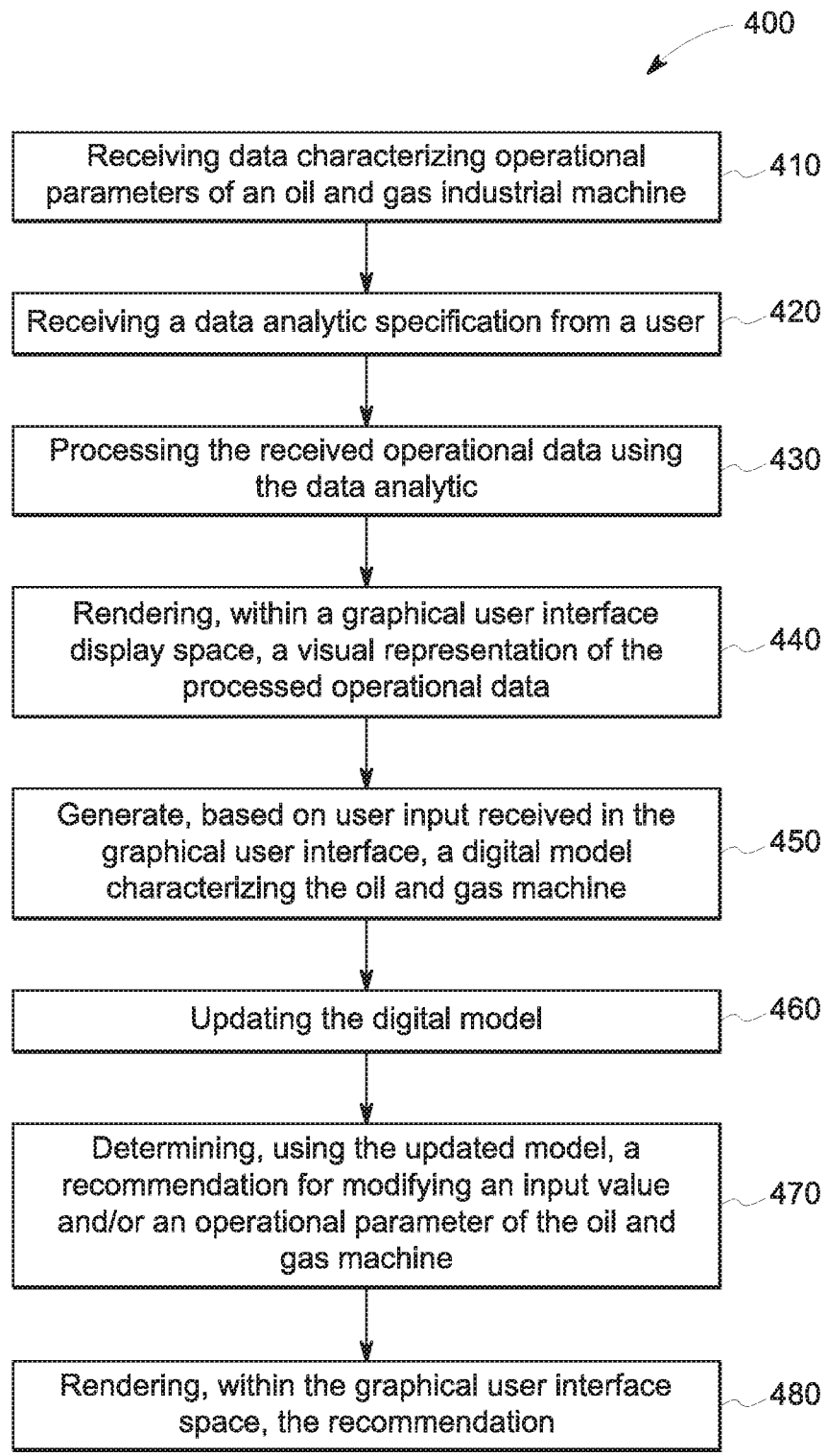
FIG. 4 is a process flow diagram illustrating an example process according to some aspects of the current subject matter.

FIG. 4 is a process flow diagram illustrating an example process 400 according to some aspects of the current subject matter. At 410, data is received characterizing operational parameters of an oil and gas industrial machine. At 420, a data analytic specification can be received from a user. At 430, the received operational data can be processed using the data analytic. Models can be automatically built for the user by taking advantage of a large library of modeling techniques and suggesting the best model for the data available, or allowing the user flexibility to define their own model either via code or by tuning technique parameters. At 440, a visual representation of the processed operational data can be rendered within a graphical user interface display space. At 450, a digital model characterizing the oil and gas machine can be generated based on user input received in the graphical user interface. Models can be generated not only based on user input, but also based on large scale search of best model as well as learning from experience of other users and knowledge about best models that have been used to solve similar problems. Updated and/or additional sensor data can be received. At 460, the digital model can be updated based on updated sensor data. At 470, a recommendation can be determined using the updated model. The recommendation can be for modifying an input value and/or an operational parameter of the oil and gas machine. The recommendation can be for tuning and optimizing parameters. This can apply to both machines and processes (e.g. chemical reactions in a refinery). At 480, the recommendation can be rendered within the graphical user interface space.

In some implementations and as described in more detail below, the digital model can be configured to calculate an output value based on a characteristic mathematical, physics-based, or probabilistic representation of the oil and gas industrial machine or process. The characteristic mathematical representation can include a system of equations to calculate the output value. Updating the digital model can include updating at least one variable (e.g., tunable model parameter) in the system of equations (and based on historical and recent data) and evaluating the updated model to determine an updated output value. The oil and gas industrial machine can include one or more of a crude distillation unit, control valves, a reservoir, a casing unit, pumps and tubing unit. An example application includes specific oil and gas industrial units, and generically includes interacting units that build up a system and more complex system of systems. Data characterizing one or more of the digital model and an updated output value can be communicated to a global monitoring system configured to monitor the oil and gas industrial machine (e.g., via asset performance management (APM)). An instruction to modify operation of the industrial machine can be transmitted to a controller of the oil and gas industrial machine or process with or without human supervision.

The digital model can update, using the received data as a new input value, to generate an updated output value. Updating can include evaluating the digital model with the received inputs. By evaluating the digital model with the user provided inputs, machine characteristics can be determined for hypothetical operations of the machine.

The current subject matter can be utilized to implement many different applications. For example, the current subject matter can be utilized to improve monitoring and management of oil and gas industrial machines, such as oil wells. A field, such as an oil or gas field, is a region suitable for oil or gas extraction due to its proximity to an oil or gas reservoir. An oil field, for example, can include multiple oil wells that can include borings that can extend from earth's surface to the oil reservoir. Crude oil and/or natural gas can be extracted through the oil well, for example, by oil pumps (e.g., Electrical Submersible Pump (ESP), Surface Pumping Systems (SPS), and the like). Oil pumps can create a pressure differential that can force crude oil and/or natural gas to flow from one region (e.g., reservoir) to another.

An oil pump can be a complex system with multiple operational parameters (e.g., pump speed, pump temperature, and the like). The operational parameters can be controlled by a control system. The control system can receive information related to the operational parameters of the oil pump through one or more sensors configured to detect the operational parameters. The control system can also alter the operational parameters of the oil pump, for example, by sending a control signal to the oil pump. The control system can interface with a monitoring system, which can be remotely located, can be configured to receive information (e.g., sensor data) from the control system, and provide instructions to the control system to vary the operational parameters of the oil pump.

An oil and/or gas well can include a system that extracts oil and/or gas from the ground using, for example, a pump. Production of crude oil (or natural gas) from the oil well can be improved by changing the operation of the pump. Changing the operation of the pump can include changing, for example, speed/frequency of rotation of a motor in the oil pump, pressure applied by the oil pump on crude oil, and the like. But, trying to improve the oil production by manually varying the operation can be cumbersome. And some approaches to operating the oil pump can adversely affect the oil pump. For example, setting the speed/frequency of the motor in the pump above a threshold value can reduce the lifetime of the motor. And that threshold may be dynamic, for example, vary with other characteristics of the well, such as down hole pressure. To guide the user in improving oil production, the current subject matter can enable visualizations and recommendations to modify one or more operating parameters such as pump speed. By simulating well operations, an operator can explore making hypothetical changes to the well operation without having to actually modify operation of the well. In addition, the interface can automatically provide recommendations for how to modify the oil well to achieve an increase in production. Additionally, the user can remotely alter oil well operation, such as altering the operation of the pump. This remote modification of the oil well can be based on the hypothetical change in operation used in the simulation.

An output value of a digital model can include, for example, operational characteristics of the oil and gas industrial machine (e.g., pump characteristics of the well), raw measurement data from sensors coupled with the oil and gas industrial machine, and the like. The operational characteristics can be calculated using the digital model by a monitoring system configured to monitor the operation of the oil and gas industrial machine (e.g., monitoring system). For example, a digital twin representing an oil well can include a system of equations that characterize the oil well. For example, an oil well can be represented, in part, by the following system of equations:

$$D = a_0 + a_1 x + a_2 x^2 + \ldots$$

$$S = b_0 + b_1 D + b_2 x^2 + \ldots$$

$$V = c_0 + c_1 S + c_2 D + c_3 x^2 + \ldots$$

where, for example, "D" represents density, "S" represents surface tension, "V" represents viscosity, "x" represents input data (e.g., data provided by a user, detected by a sensor associated with the oil and gas industrial machine, and the like). The system of equations can be coupled (e.g., output of a first equation can be used as an input to a second equation in the system of equations). The system of equations can allow for determination of density, surface tension and viscosity from input data and system coefficients (e.g., $a_0, a_1, a_2, b_0, b_1, b_2, c_0, c_1, c_2, c_3$, and the like). The input data and system coefficients can be determined, for example, based on predetermined values in a database, input provided by a user, measurement from a sensor coupled to the oil and gas industrial machine, and the like. The visual representation of the output value can include, for example, a plot of the calculated pump characteristics with respect to an operational parameter of the oil and gas industrial machine.

Recommendations can be determined and provided. Recommendations (which can be presented in a GUI display) can be for improving the performance of the oil pump (e.g., "Increase Well Head Pressure," "Resize ESP pump," and the like). The recommendations can also include the likely result (e.g., on the crude oil production) of the recommendation. For example, a recommendation can include suggesting decreasing the well head pressure (WHP) to 37.9 psig, which the system has determined would result in a crude oil production increase by additional 1705.1 standard barrel per day (stb/d).

The digital model can update, using the received data as a new input value, to generate an updated output value. For example, the monitoring system (e.g., monitoring system 500) can recalculate pump characteristics using the digital model that takes the received data (e.g., representing input values of the operational parameters from the user) as inputs. Updating can include evaluating the digital model with the received inputs. By evaluating the digital model with the user provided inputs, pump characteristics can be determined for hypothetical operations of the pump.

The recommendation engine can include a rules engine that receives the digital model outputs and generates a recommendation according to a rule set. The recommendations can present to the user a "What if approach" that can allow the user to simulate various scenarios having different combinations of operating parameters values and monitor the resulting crude oil production. For example, the GUI can include two recommendations (which can be color coded): (1) "Decrease Well Head Pressure to 2000 psig" 240 (represented using red color) and (2) "Increase the Frequency to 56.1 Hz" 242 (represented using blue color). The first recommendation can include setting the operating frequency to 54.2 hertz and altering the well head pressure to achieve a flow rate of 7200 stb/d for the crude oil. The second recommendation can include setting the well head pressure to a constant value, and varying the operating pump frequency to achieve a flow rate of 7200 stb/d for the crude oil.

The user can choose one of the many recommendations based on his/her experience. For example, the user may choose to change the operational parameters of the oil pump in the oil well based on the second recommendation. This can be done, for example, by selecting the second recommendation (e.g., by clicking on the dialog box of the second recommendation) and clicking on the "Update Control"

button 250. This can select the operational parameter values based on the second recommendation, and send a control signal to a control system associated with the oil pump which can alter the operational parameters of the oil pump.

Figure 5:
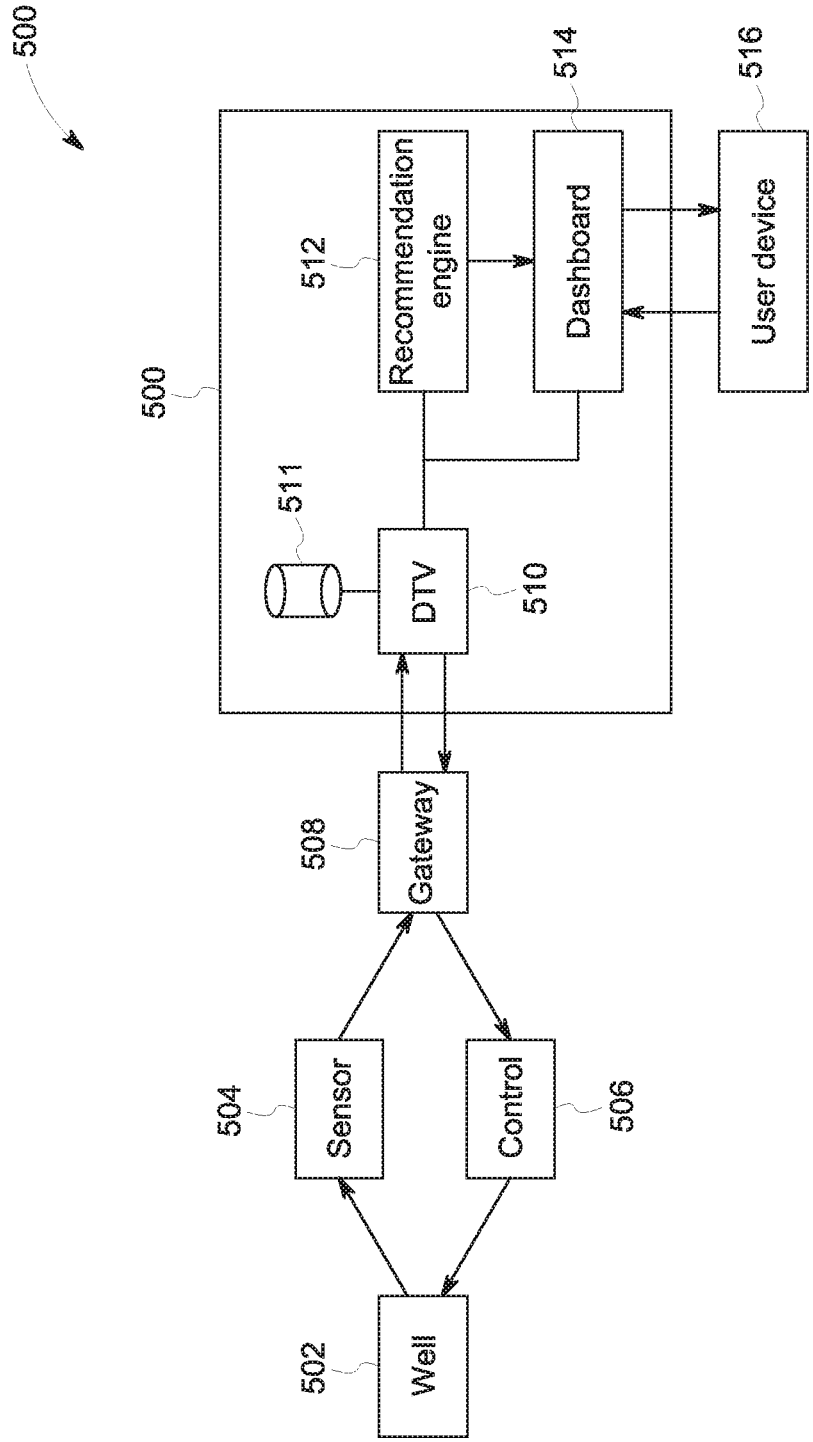
FIG. 5 illustrates and exemplary embodiment of a system block diagram of a monitoring system that can communicate with an oil well.

FIG. 5 illustrates and exemplary embodiment of a system block diagram of a monitoring system 500 that can communicate with an oil well 502. The monitoring system 500 can operationally couple to an oil well 502, for example, via sensors 504 and control system 506 associated with the oil well 502. The sensors 504 and control system 506 can communicate with the monitoring system 500 via a gateway 508 (e.g., a router). The monitoring system 500 can include a DTV system 510, a recommendation engine 512 and a dashboard 514. The recommendation engine 512 can include a rules engine that receives the digital model outputs and generates a recommendation according to a rule set.

Sensors 504 can include any type of sensor that can be incorporated into an industrial machine such as pressure sensor, vibration sensor, temperature sensor, humidity sensor, and the like. As an example, an oil well can include sensors measuring pump frequency, pressure, temperature, and the like.

Control system 506 can include a controller operably coupled with the oil well. The control system 506 can alter the operational parameters of the oil pump, for example, by changing the frequency of the pump.

The DTV system 510 can receive operational parameters detected by the sensors 504, and transmit control signal to the control system 506. The DTV system 510 can calculate pump characteristics based on the received operational parameter and system coefficients which can be stored in a memory device 511. The DTV system 510 can also communicate with the recommendation engine 512 (e.g., provide pump characteristics) and the dashboard 514 (e.g., provide the dashboard 514 with operating parameters and pump characteristics, and receive from the dashboard 514 with new inputs provided by the user). The recommendation engine 512 can also communicate with the dashboard 514 (e.g., provide the dashboard 514 with recommendations). The dashboard 514 can communicate with a graphical user interface in a user device 516 (e.g., receive inputs from the GUI and provide recommendations, operating parameters and pump characteristics to the user device 516).

Figure 6:
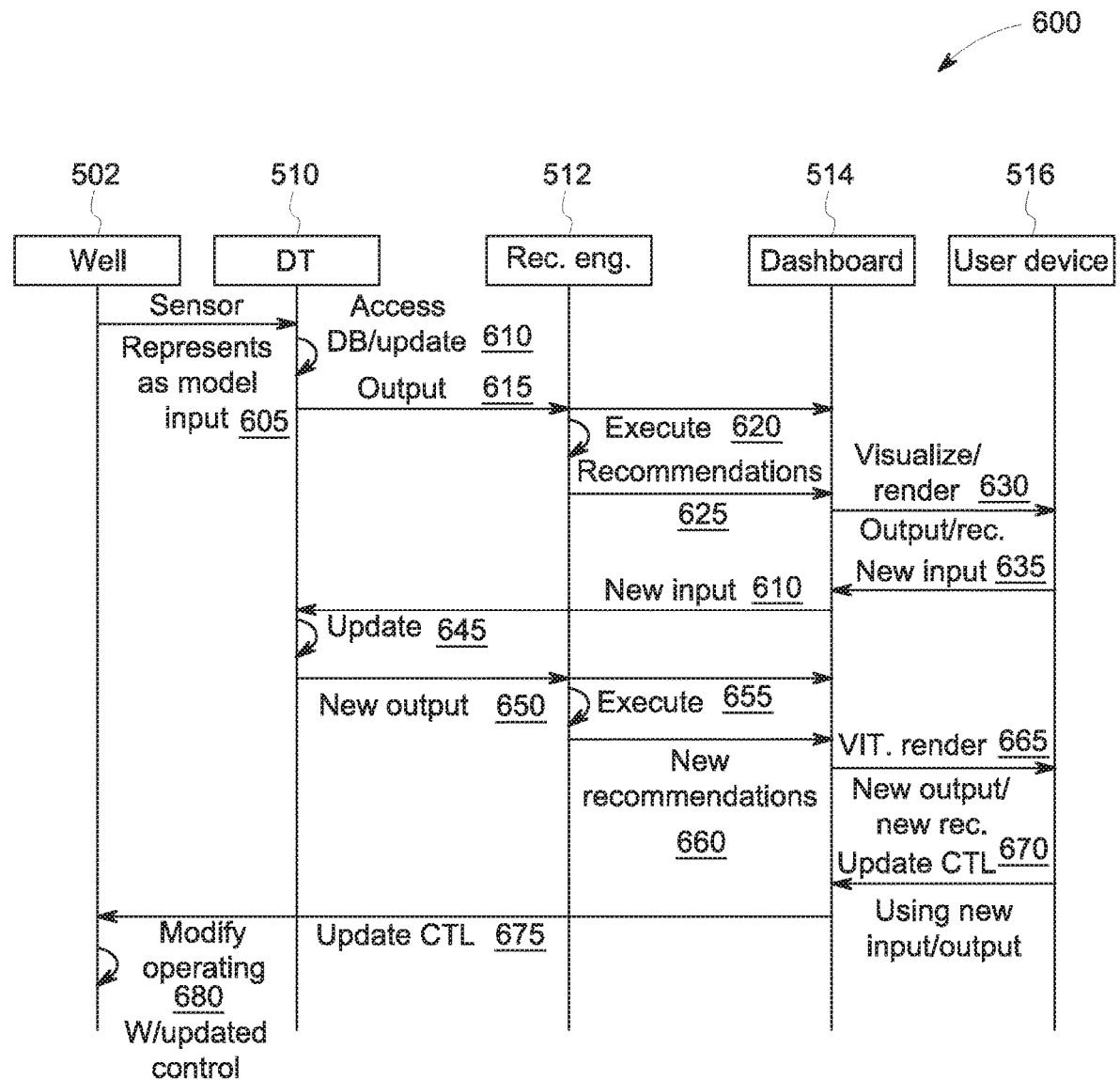
FIG. 6 illustrates an exemplary data flow diagram of the block diagram described in FIG. 5.

FIG. 6 illustrates an exemplary data flow diagram of the block diagram described in FIG. 5. At 605, the operational parameters of the oil well 502 detected by the sensors 504 is communicated to the DTV system 510. At 610, the DTV system 510 can calculate the pump characteristics based on one or more of the operational parameters. At 615, the pump characteristics are communicated to the recommendation engine 512 and the dashboard 514. At 620, the recommendation engine 512 can calculate the recommendation, for example, based on pump characteristics from the DTV system 510. At 625 the recommendations can be communicated to the dashboard 514 that can generate visual representation for the recommendation, operational parameters, pump characteristics and graphical objects to receive inputs from the user. The visual representation can be communicated to the user device at 630. At 635, the user device 516 can communicate the inputs received from the user to the dashboard 514, which can communicate the received input to the DTV system 510 (at 640). At 645, the DTV system 510 can update by recalculating the pump characteristics. At 650, the recalculated pump characteristics can be communicated to the recommendation engine 512 and the dashboard 514. At 655, the recommendation engine 512 can calculate a new recommendation (e.g., based on the recalculated pump characteristics). At 660 the new recommendation can be communicated to the dashboard 514. The dashboard 514 can generate visual representations for the new recommendation, and new operational parameters, new pump characteristics. The visual representations can be communicated to the user device at 665. At 670, the user device 516 can communicate the inputs received from the user to the dashboard 514 to the control system 506 (at 675). At 680, the control system can modify the operational parameters of the oil pump in the oil well 502. For example, rate of rotation (frequency) of a motor in the oil pump can be increased/decreased, a gate in a valve associated with the oil pump can be moved (e.g., opened, closed, and the like). In some implementations, the control system can store/alter/modify operating parameter values in an oil pump database. The stored/altered/modified operating parameter values can be used to operate the oil pump (e.g., at a later time).

The subject matter described herein can provide many technical advantages. For example, some implementations of the current subject matter provide for an ability to orchestrate and run analytics written in multiple programming languages; to run millions of analytics concurrently at scale on-demand; to monetize existing datasets that have been collected over many years; to re-use and monetize domain expertise locked-up in legacy systems; and/or unlock new business models and use-cases for legacy data and analytics along with new products.

For example, the current subject matter can provide a solution to the explosion in the volume, velocity and variety of datasets in the industrial world. Current information systems may not be able to handle even 1% of the workloads required for routine processing in industrial internet of things systems. Real time and batch analytics used to solve problems such as production optimization, risk minimization, process control and optimization require infrastructure for running analytics at very large scales. These analytics provide inputs to highly consequential decision systems that need very high reliability and repeatability. In addition, in industrial systems, data collection has traditionally been sporadic and highly disjointed and without readily available solutions to combine data in disparate sources exist. Moreover, industrial companies have long history of developing models and analytics in multiple languages such as Fortran, C, C++, .Net, Matlab, Python, R and the like, which are considered key domain expertise that cannot feasibly be re-written (due to cost and practical limitations).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving sensor data characterizing operational data associated with a machine;
   receiving a data analytic specification from a user;
   processing the received operational data using the data analytic;
   rendering, within a graphical use interface, a plurality of digital models characterizing the machine as a ranked list, wherein the digital models are configured to output values representing operational characteristics of the machine based upon the received operational parameters,
   receiving, via the graphical user interface, a user selection of a digital model from the rendered plurality of digital models;
   rendering, within the graphical user interface, a visual representation of the processed operational data and output values of the digital model;
   receiving additional sensor data;
   updating the output values of the selected digital model based on the received additional sensor data;
   determining, using the updated output values, a recommendation for modifying an operational parameter of the machine; and
   rendering, within the graphical user interface space, the recommendation.

2. The method of claim 1, wherein the plurality of digital models includes a system of coupled equations.

3. The method of claim 1, wherein the machine includes one or more of a crude distillation unit, control valves, a reservoir, a casing unit, pumps and tubing unit.

4. The method of claim 1, further comprising:
   communicating data characterizing one or more of the digital model and an updated output value to a global monitoring system configured to monitor the machine.

5. The method of claim 1, further comprising:
   transmitting, to a controller of the machine, an instruction to modify operation of the industrial machine.

6. The method of claim 1, further comprising:
   rendering, within a graphical user interface space, metadata related to the received data analytic, the meta data including statistical properties, gaps, distributions and/or correlations.

7. A system comprising:
   at least one data processor;
   memory coupled to the at least one data processor, the memory storing instructions to cause the at least one data processor to perform operations comprising:
   receiving sensor data characterizing operational data associated with a machine;
   receiving a data analytic specification from a user;

processing the received operational data using the data analytic;

rendering, within a graphical user interface, a plurality of digital models characterizing the machine as a ranked list, wherein the digital models are configured to output values representing operational characteristics of the machine based upon the received operational parameters;

receiving, via the graphical user interface, a user selection of a digital model from the rendered plurality of digital models;

rendering, within the graphical user interface, a visual representation of the processed operational data and output values of the digital model;

receiving additional sensor data;

updating the output values of the selected digital model based on the received additional sensor data;

determining, using the updated output values, a recommendation for modifying an operational parameter of the machine; and rendering, within the graphical user interface space, the recommendation.

8. The system of claim 7, wherein the plurality of digital models include a system of coupled equations.

9. The system of claim 7, wherein the machine includes one or more of a crude distillation unit, control valves, a reservoir, a casing unit, pumps and tubing unit.

10. The system of claim 7, the operations further comprising:

communicating data characterizing one or more of the digital model and an updated output value to a global monitoring system configured to monitor the machine.

11. The system of claim 7, the operations further comprising:

transmitting, to a controller of the machine, an instruction to modify operation of the industrial machine.

12. The system of claim 7, the operations further comprising:

rendering, within a graphical user interface space, metadata related to the received data analytic, the meta data including statistical properties, gaps, distributions and/or correlations.

13. A computer program product comprising a non-transitory machine-readable medium storing instructions that, when executed by at least one programmable processor that comprises at least one physical core and a plurality of logical cores, cause the at least one programmable processor to perform operations comprising:

receiving sensor data characterizing operational data associated with a machine;

receiving a data analytic specification from a user;

processing the received operational data using the data analytic;

rendering, within a graphical user interface, a plurality of digital models characterizing the machine as a ranked list, wherein the digital models are configured to output values representing operational characteristics of the machine based upon the received operational parameters;

receiving, via the graphical user interface, a user selection of a digital model from the rendered plurality of digital models;

rendering, within the graphical user interface, a visual representation of the processed operational data and output values of the digital models;

receiving additional sensor data;

updating the output values of the selected digital model based on the received additional sensor data;

determining, using the updated output values, a recommendation for modifying an operational parameter of the machine; and rendering, within the graphical user interface space, the recommendation.

14. The computer program product of claim 13, wherein the plurality of digital models includes a system of coupled equations.

15. The computer program product of claim 13, wherein the machine includes one or more of a crude distillation unit, control valves, a reservoir, a casing unit, pumps and tubing unit.

16. The computer program product of claim 13, the operations further comprising:

communicating data characterizing one or more of the digital model and an updated output value to a global monitoring system configured to monitor the machine.

17. The computer program product of claim 13, the operations further comprising:

transmitting, to a controller of the machine, an instruction to modify operation of the machine.

* * * * *